J. S. HENDERSON.
FLANGE OILING DEVICE.
APPLICATION FILED JULY 11, 1914.
1,169,818.
Patented Feb. 1, 1916.
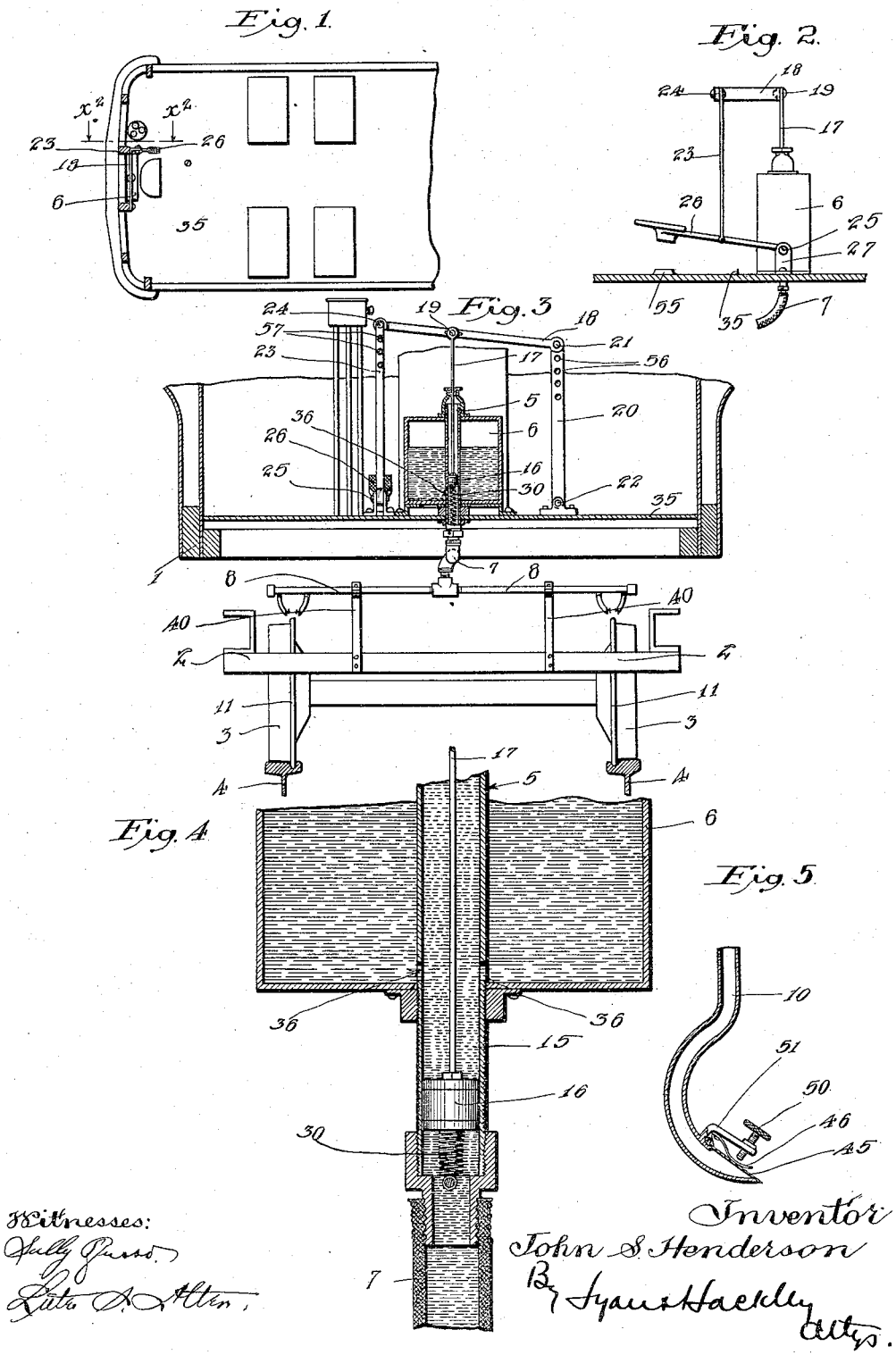

UNITED STATES PATENT OFFICE.

JOHN S. HENDERSON, OF LOS ANGELES, CALIFORNIA, ASSIGNOR OF FORTY-NINE ONE-HUNDREDTHS TO GEORGE W. LEE, OF LOS ANGELES, CALIFORNIA.

FLANGE-OILING DEVICE.

1,169,818.  Specification of Letters Patent.  Patented Feb. 1, 1916.

Application filed July 11, 1914. Serial No. 850,439.

*To all whom it may concern:*

Be it known that I, JOHN S. HENDERSON, a citizen of the United States, residing at Los Angeles, in the county of Los Angeles and State of California, have invented a new and useful Flange-Oiling Device, of which the following is a specification.

This invention is an oiling device.

The object in general of the invention is to provide an oiling device to be carried on a car for oiling the car wheel flanges and the curve of the car track, as the car travels around the curve, to enable the car wheel flanges to travel smoothly around the curve without wear and without making a disagreeable noise.

Another object is to provide an improved oiling device for ejecting a predetermined amount of oil.

Other objects will appear hereinafter.

Referring to the drawing: Figure 1 is a horizontal sectional view of a car, and a plan of my oiling device mounted thereon. Fig. 2 is a fragmental section on line $x^2$—$x^2$ of Fig. 1. Fig. 3 is an elevation of the oiling device, and a cross sectional view of the car, showing the relation of the oiler nozzles to the car wheel flanges. Fig. 4 is an enlarged view of the pump. Fig. 5 is an enlarged vertical section of one of the nozzles.

The device is mounted upon a car body 1, which is mounted on a truck 2, having wheels 3, which travel on track 4. The device comprises an oil pump 5, an oil tank 6, a flexible pipe 7 leading from the lower end of the pump 5, a pipe 8 connected to the pipe 7 and extending transversely of the truck 2, and nozzles 10, connected to the ends of the pipe 8 and leading to the uppermost portions of the flanges 11 of the wheels 3.

The pump 5 comprises a cylinder 15, a piston 16 which reciprocates in the cylinder 15, a piston rod 17, a link 18 to which said piston rod is pivoted at 19, a link 20, pivoted respectively at 21 to one end of the link 18, and at 22 to the car body 1, a link 23, pivoted respectively at 24 to the other end of the link 18, and at 25 to an operating lever 26, which is fulcrumed upon the car body 1 at 27. Within the cylinder 15, between the lower end thereof and the piston 16, is a spring 30, adapted to return the piston and the operating parts to initial position when the piston has been forced downwardly, and to maintain the piston and the operating parts in initial position when the pump is not in operation. The oil tank 6 is supported upon the floor 35 of the car body 1, and the pump cylinder 15 is located within the tank, with its lower end extending through the bottom wall of the tank and the floor 35 of the car body. The pump cylinder is provided with ports 36, which provide communication between the interior of the tank and the interior of the pump cylinder.

The pipe 8 is supported on the forward part of truck 2 by standards 40 in such position that the extremities of the nozzles 10 rest slightly above the flanges 11 of the front wheels of the truck so that said nozzles will not engage said wheels during the movement of the truck frame on its springs with relation to the wheels. The extremities of the nozzles 10 are provided with valves 45, normally held closed by springs 46. Set-screws 50 in brackets 51, secured to the nozzles, engage the valves 45 to limit the open positions of the valves so as to control the amount of oil that flows from the nozzles onto the wheel flanges 11. By turning the set-screws 50 the open position of the valves may be adjusted to different limits. A stop 55, secured to the floor 35 of the car body, limits the downward movement of the lever 26. The links 20 and 23 are each provided with a plurality of holes 56, and 57, respectively, for pivoting the ends of the link 18 at different points on the links 20 and 23 so as to vary the movement of the lever 26 and the stroke of the piston 16.

The operation of the device is as follows: Assuming the parts to be in their initial position, as shown in Fig. 2 of the drawing, the piston 16 lies above the ports 36, and the oil in the tank 6 has entered the cylinder 15 through the ports 36 and fills the space in the cylinder below the piston and the pipes 7 and 8 and the nozzles 10. As the car wheels reach the curve in the track, the lever 26 is depressed until arrested by the stop 55, which movement of the lever, through the links 23, 18 and 20, causes the piston 16 to descend and force the oil in the pipes 7 and 8 and in the cylinder 15 out of the ends of the nozzles 10 (the valves 45 opening under the pressure of the oil) onto the wheel flanges 11, around which the oil flows into the track 4. The movement of the lever 26 and the stroke of the piston 16 may be set by proper adjustment of the link connections 21 and 24 so that the piston will eject an amount of oil from the nozzles 10 sufficient to oil the curve of the track throughout its length.

The pipe 7 is extensible, so that the pipe 8 may turn with the truck when the truck travels around a curve.

The flanges of the wheels of street railway cars usually run in a groove as shown in the drawing, and in such cases it is essential that both sides of the wheel flanges be lubricated, and for this reason I provide the nozzles 10 in pairs. It will be noted that the nozzles extend downwardly from the oil pipe 8 and converge toward the wheel flange terminating short thereof and on opposite sides.

What I claim, is:

In a flange oiling device, a pipe extending above the flange to be oiled, a nozzle connected to said pipe and extending downwardly toward the flange, a flap valve closing the lower end of the nozzle and opening toward the flange, an arm secured to the nozzle and projecting across the flap valve in spaced relation thereto, a spring connected to said arm and bearing against the flap valve to hold the same closed, and means to regulate the outward movement of the spring whereby the outward movement of the flap valve is controlled.

In testimony whereof, I have hereunto set my hand at Los Angeles, California, this 2nd day of July, 1914.

JOHN S. HENDERSON.

In presence of—
 LORA M. BOWERS,
 LORRAINE E. DURROW

Copies of this patent may be obtained for five cents each, by addressing the "Commissioner of Patents, Washington, D. C."